(12) United States Patent
Gustafsson

(10) Patent No.: US 6,424,841 B1
(45) Date of Patent: Jul. 23, 2002

(54) SHORT MESSAGE SERVICE WITH IMPROVED UTILIZATION OF AVAILABLE BANDWIDTH

(75) Inventor: Patrik G. Gustafsson, Foster City, CA (US)

(73) Assignee: Openwave Systems Inc., Redwood City, CA (US)

(*) Notice: Subject to any disclaimer, the term of this patent is extended or adjusted under 35 U.S.C. 154(b) by 0 days.

(21) Appl. No.: 09/252,960

(22) Filed: Feb. 18, 1999

(51) Int. Cl.[7] .............................. H04B 1/04; H04Q 7/20
(52) U.S. Cl. ....................... 455/466; 455/466; 455/417
(58) Field of Search ................................ 455/422, 450, 455/466, 517, 426; 370/428, 338, 394; 709/203, 227; 707/10

(56) References Cited

U.S. PATENT DOCUMENTS

| | | |
|---|---|---|
| 5,481,539 A | 1/1996 | Hershey et al. |
| 5,579,372 A | 11/1996 | Åström |
| 5,692,032 A | 11/1997 | Seppänen et al. |
| 5,748,100 A * | 5/1998 | Gutman et al. ......... 340/825.44 |
| 5,751,708 A | 5/1998 | Eng et al. |
| 5,809,415 A | 9/1998 | Rossmann |
| 5,930,239 A * | 7/1999 | Turcotte .................... 370/310 |
| 6,108,325 A * | 8/2000 | Stephanson et al. ........ 370/337 |
| 6,119,167 A | 9/2000 | Boyle et al. |
| 6,138,158 A | 10/2000 | Boyle et al. |
| 6,163,546 A * | 12/2000 | Sipila .......................... 370/446 |
| 6,185,208 B1 * | 2/2001 | Liao ............................ 370/392 |

OTHER PUBLICATIONS

Global System for Mobile Communications (GSM) 03.40, version 5.6.1, European Telecommunications Standards Institute (ETS) (ETS 300 901), Jan. 1998.

* cited by examiner

Primary Examiner—Edward F. Urban
Assistant Examiner—Meless Zewdu
(74) Attorney, Agent, or Firm—Beyer Weaver & Thomas, LLP

(57) ABSTRACT

Techniques that enable wireless client devices to more efficiently utilize available transmission bandwidth in a wireless network are disclosed. In one embodiment, the techniques operates to include or incorporate return information (data) in an acknowledgement message after an incoming message has been successfully received from a sender. As a result, messages are able to be effectively sent over the wireless network with less overhead. The techniques are particularly suitable for a Global System for Mobile Communications (GSM) network that is capable of bi-directional communications with a short message service center (SMSC).

28 Claims, 14 Drawing Sheets

SUBMIT SUCCESS REPORT

SUBMIT ERROR REPORT

DELIVERY ERROR REPORT

SHORT MESSAGE SERVICE WITH IMPROVED UTILIZATION OF AVAILABLE BANDWIDTH

CROSS-REFERENCE TO RELATED APPLICATIONS

This application is related to (i) U.S. application Ser. No. 09/170,879, filed Oct. 20, 1998, and entitled "WIRELESS MOBILE DEVICES HAVING IMPROVED OPERATION DURING NETWORK UNAVAILABILITY"; (ii) U.S. application Ser. No. 09/172,105, filed Oct. 13, 1998, and entitled "METHOD AND APPARATUS FOR PROVIDING ELECTRONIC MAIL SERVICES DURING NETWORK UNAVAILABILITY," now U.S. Pat. No. 6,289,212; (iii) U.S. application Ser. No. 08/977,572, filed Jul. 11, 1997, and entitled "PUSHING AND PULLING DATA IN NETWORKS," now U.S. Pat. No. 6,119,167; (iv) U.S. application Ser. No. 09/070,668, filed Apr. 30, 1998, and entitled "METHOD AND APPARATUS FOR PROVIDING NETWORK ACCESS OVER DIFFERENT WIRELESS NETWORKS," now U.S. Pat. No. 6,314,108; and (v) U.S. application Ser. No. 09/105,691, filed Jun. 26, 1998, and entitled "METHOD AND APPARATUS FOR FRAGMENTING MESSAGES FOR A WIRELESS NETWORK USING GROUP SHARING OF REFERENCE NUMBERS," now U.S. Pat. No. 6,185,208; the contents of all of which are hereby incorporated by reference.

BACKGROUND OF THE INVENTION

1. Field of Invention

This invention generally relates to wireless communication systems and, in particular, to short message service (SMS) communications in wireless communication systems.

2. Discussion of Related Art

The tremendous growth of the Internet in recent years has fueled the need to provide wireless devices such as mobile telephones, personal digital assistants (PDAs) and the like with access to information and services available on the Internet. However, providing wireless devices with access to the Internet is complicated by the fact that various different carrier networks with different wireless network characteristics are used domestically and world wide to communicate with the wireless devices. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Message System (SMS) and Unstructured Supplementary Service Data (USSD), and connection methods can include packet switched or circuit switched. A carrier transport ID indicates the protocol used by the network, such as User Datagram Protocol (UDP), Short Message Peer-to-peer Protocol (SMPP), or Wireless Datagram Protocol (WDP).

Wireless communications are used for voice and data communications. In the case of wireless data communications, one type of service that can be provided by wireless networks is SMS. Short Message Server Centers (SMSCs) associated with the wireless networks provide the SMS service. SMS gives subscribers the ability to receive a relatively small amount of information over the wireless networks. The information provided through SMS is generally referred to as messages and can, for example, include text messages, electronic mail (email), voice mail, message alerts and pages from pagers. SMS tends to be a more cost effective means for the transmission of small amounts of data because SMS uses considerably less bandwidth than a typical wireless phone call or wideband network connection. SMS channel usage is also typically charged to subscribers at a fixed cost per month so its bandwidth, although limited, tends to be relatively inexpensive for subscribers.

One-way-SMS represents a narrowband channel that can carry data in primarily one direction, with acknowledgements going in the opposite direction. Two-way SMS allows bi-directional communications over SMS using a channel with a relatively low bandwidth, which is slightly greater in capacity than that provided by one-way SMS.

An SMS communications system can be thought of as a client-server type of system where a client device makes a request, and upon reception, a server device acknowledges whether or not the request was received in tact. In the case of SMS, the acknowledgements represent a success report if the request was successfully received or an error report if the request was not successfully received. For example, when a mobile device sends a message to an SMSC, the SMSC returns a report to the mobile device to either confirm receipt of the message or to notify of error in the delivery of the message. If the message is received successfully, the SMSC stores and forwards the message to an entity capable of receiving SMS messages. This forwarded message contains the address of the originating entity. In a similar fashion, when the SMSC delivers a message to a mobile device, the mobile device returns a report to the SMSC to either confirm receipt of the message or to notify of error in the delivery of the message.

These reports, which provide an indication of a successful or failed delivery process, are referred to as SMS acknowledgement messages. SMS acknowledgement messages are comprised of a plurality of pre-defined functional fields. Examples of successful acknowledgement reports include the Submit Success Report (SSR) and the Delivery Success Report (DSR). These multi-field success acknowledgement reports have a well-defined structure, which includes user data fields. These user data fields are generally not utilized at present and therefore they represent wasted bandwidth to the network. The failed reception acknowledgement error reports are referred to as error reports and do not have user data fields. SMS is further described in Global System for Mobile Communications (GSM) 03.40, versions 5.6.1, European Telecommunications Standards Institute (ETS) (ETS 300 901), January 1998, which is hereby incorporated by reference.

Thus, given the growth of wireless services and the fixed cost pricing of SMS channels, there exists a need for more efficient utilization of SMS systems to accommodate an increase in subscribers and their usage.

SUMMARY OF THE INVENTION

Broadly speaking, the present invention relates to techniques that enable wireless client devices to more efficiently utilize the available transmission bandwidth in a wireless network. In one embodiment, the invention operates to include or incorporate return information (data) in an acknowledgement message after an incoming message has been successfully received from a sender.

The invention can be implemented in numerous ways, including as a method, an apparatus, and a computer readable medium. Several embodiments of the invention are discussed below.

As a method for sending messages between a client device and a server device through a narrowband channel of a wireless data network, one embodiment of the invention includes the acts of: receiving a message at the client device, the message being sent from the server device to the client device through the narrowband channel of the wireless data network; preparing an acknowledgement message to be returned to the server device, the acknowledgement message including at least a portion of another message destined for the server device; and sending the acknowledgement message to the server device. As an example, the client device can be a personal digital assistant, a mobile telephone device, or a pager.

As a method of transmitting message packets from an initiating unit to a receiving unit over a wireless data network using a Short Message Service Center, one embodiment of the invention includes the acts of: maintaining, at the receiving unit, a message queue of messages awaiting delivery; receiving, at the receiving device, a message from the initiating unit over the wireless communications using the Short Message Service Center; determining whether the received message is valid; determining whether the message queue contains a deferred message awaiting delivery to the initiating unit; generating an acknowledgement message that incorporates at least a portion of the deferred message awaiting delivery to the initiating unit; and forwarding the acknowledgement message to the wireless client device over the wireless communications using the Short Message Service Center.

As a computer readable medium including computer program code for sending messages between a client device and a server device through a channel of a wireless data network, one embodiment of the invention includes: computer program code for receiving a message at the client device, the message being sent from the server device to the client device through the channel of the wireless data network; computer program code for preparing an acknowledgement message to be returned to the server device, the acknowledgement message including data destined for the server device; and computer program code for sending the acknowledgement message to the server device.

As a computer readable medium including computer program code for of transmitting message packets from an initiating unit to a receiving unit over a wireless data network using a Short Message Service Center, one embodiment of the invention include: computer program code for maintaining, at the receiving unit, a message queue of messages awaiting delivery; computer program code for receiving, at the receiving device, a message from the initiating unit over the wireless communications using the Short Message Service Center; computer program code for determining whether the received message is valid; computer program code for determining whether the message queue contains a deferred message awaiting delivery to the initiating unit; computer program code for generating an acknowledgement message that incorporates at least a portion of the deferred message awaiting delivery to the initiating unit; and computer program code for forwarding the acknowledgement message to the wireless client device over the wireless communications using the Short Message Service Center.

As an apparatus for sending and receiving messages over a wireless data network, one embodiment of the invention includes: an outgoing data queue that stores data to be sent over the wireless data network; a message manager, the message manager manages (i) the reception of incoming messages from senders over the wireless data network and (ii) the generation of outgoing messages to be sent over the wireless data network; a storage medium that stores the incoming messages; and a processing module operatively connected to said message manager and said storage medium, said processing module interacts with said storage medium and said message manager to request, send and receive data over the wireless data network. The outgoing messages generated by said message manager include acknowledgement messages that acknowledge the receipt of at least some of the incoming messages. Depending on availability of data in said outgoing data queue, the acknowledgement messages generated by said message manager include data from said outgoing data queue destined for the respective senders of the incoming messages being acknowledged.

The advantages of the invention are numerous. Different embodiments or implementations may yield one or more of the following advantages. One advantage of the invention is that wireless devices to more efficiently utilize the available transmission bandwidth of a narrowband channel (e.g., SMS channel) in a wireless network. Another advantage of the invention is that it facilitates cost-effective use of a narrowband channel (e.g., SMS channel) in a wireless network. Still another advantage of the invention is that non-time critical messages can be sent over a wireless network in efficient, cost-effective way.

Other aspects and advantages of the invention will become apparent from the following detailed description taken in conjunction with the accompanying drawings which illustrate, by way of example, the principles of the invention.

BRIEF DESCRIPTION OF DRAWINGS

The present invention will be readily understood by the following detailed description in conjunction with the accompanying drawings, wherein the reference numerals illustrate the structural elements, and in which.

DETAILED DESCRIPTION OF THE INVENTION

The present invention relates to techniques that enable wireless client devices to more efficiently utilize the available transmission bandwidth in a wireless network. In one embodiment, the invention operates to include or incorporate return information (data) in an acknowledgement message after an incoming message has been successfully received from a sender.

The invention is particularly applicable to a Global System for Mobile Communications (GSM) network that is capable of bi-directional communications with a short message service center (SMSC). It will be appreciated by one of ordinary skill in the art that invention could be applied to wireless networks other than such GSM networks.

Wireless client devices, also referred to as mobile devices or wireless communication devices, include but are not limited to personal digital assistants (PDAs), mobile telephones (including cellular phones), pagers, or wireless capable remote controllers. Typically, these wireless client devices have much less computing resource than a desktop or laptop computer does.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Embodiments of the invention are discussed below with reference to FIGS. 1A–8B. However, those skilled in the art will readily appreciate that the detailed description given herein with respect to these figures is for explanatory purposes as the invention extends beyond these limited embodiments.

Figure 1A:
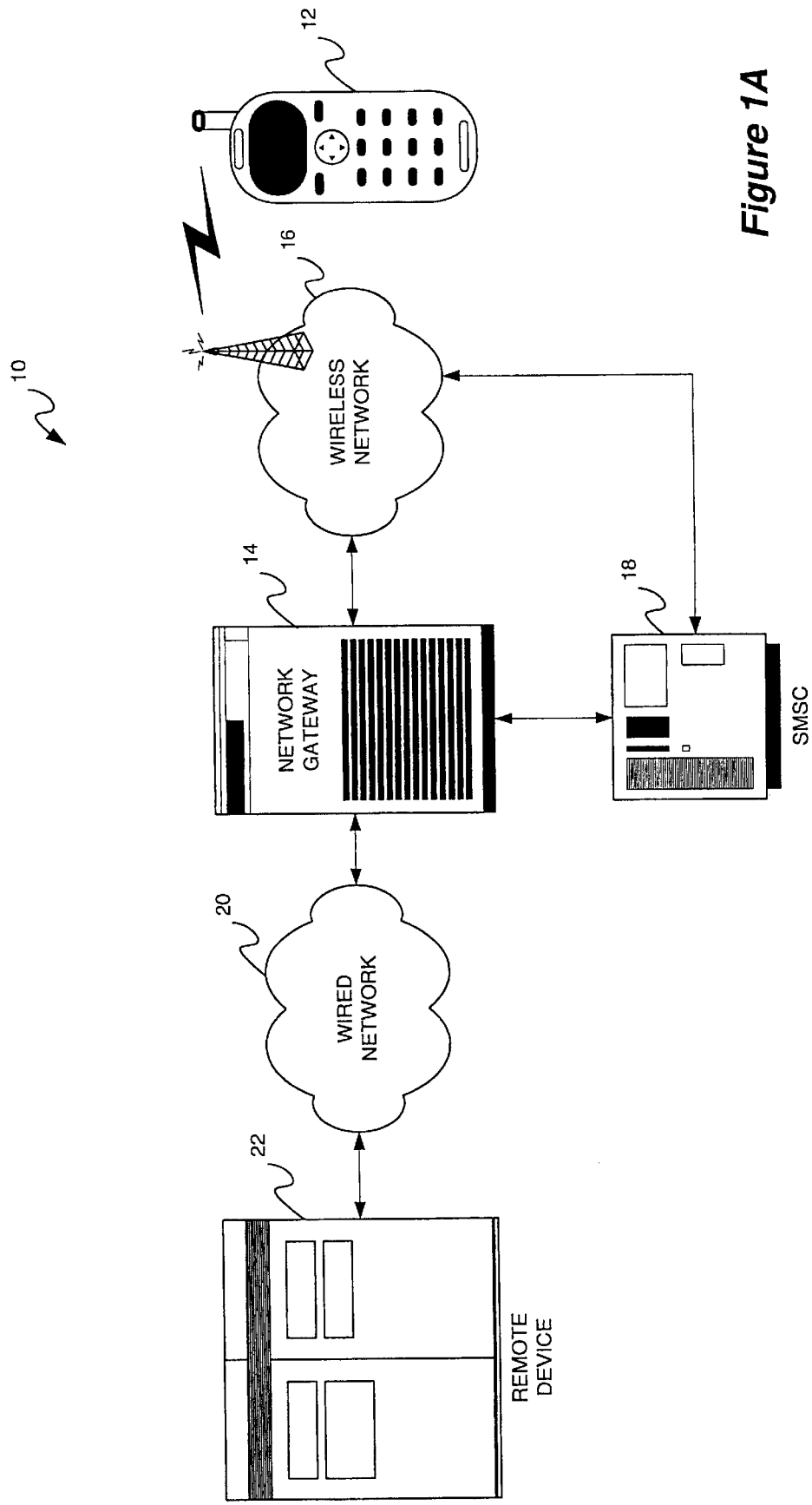
FIG. 1A is a block diagram of a wireless communication system according to one embodiment of the invention.

FIG. 1A is a block diagram of a wireless communication system 10 according to one embodiment of the invention. Wireless communication system 10 supports a plurality of wireless communication devices (also known as mobile devices, wireless client devices, etc.). For convenience, only a single wireless communication device 12 is illustrated in FIG. 1A. Wireless communication device 12 communicates with a network gateway 14 through a wireless network 16. Also, wireless communication device 12 communicates with a Short Message Service Center (SMSC) 18 through wireless network 16. SMSC 18 also connects to network gateway 14. Often, a first carrier network in wireless network 16 provides a wideband channel that couples network gateway 14 to wireless communication device 12, and a second carrier network in wireless network 16 provides a narrowband channel that couples SMSC 18 to wireless communication device 12. Subscribers that use the plurality of wireless communication devices are normally charged for connect time when using the wideband channel. However, use of the narrowband channel is often charged to subscribers on a fixed monthly rate.

Network gateway 14 couples to a wired network 20. Wired network 20 is a data network that interconnects various remote devices, including a remote device 22 illustrated in FIG. 1A. Remote device 22 can, for example, be a server machine or a client machine. Wired network 20 can pertain to the Internet, an Intranet, or some other data network.

Wireless communication system 10 enables wireless communication device 12 to send and receive messages from the remote device 22. Such messages traverse wireless network 16, wired network 20, and either the narrowband or wideband channel. Typically, messages destined for the narrowband channel are relatively short in length. The messages destined for the narrowband channel are often known as SMS messages or short messages and have a pre-determined maximum size (e.g., 140 bytes). However, a process known as fragmentation allows messages greater than the maximum size to be sent over the narrowband channel. On the other hand, larger messages are often sent over the wideband channel at higher speed but at a greater cost.

According to the invention, the narrowband channel is more efficiently utilized to take advantage of this inexpensive resource within wireless communication system 10. More particularly, the invention manages the sending of messages over the narrowband channel such that acknowledgement messages are able to carry additional data from recipients of the messages to their senders with reduced overhead. The reduction in overhead results because fewer messages need to be generated and thus, less of the bandwidth of the narrowband channels has to be allocated for transmission of messages. The reason that messages need to be generated and transmitted is because previously unused bandwidth (e.g. the user data fields) are utilized to carry the additional data. The additional data can be related or unrelated to the acknowledgement message that carries the additional data. One example of related data is a reply to the message such as a resource returned to the sender.

Figure 1B:
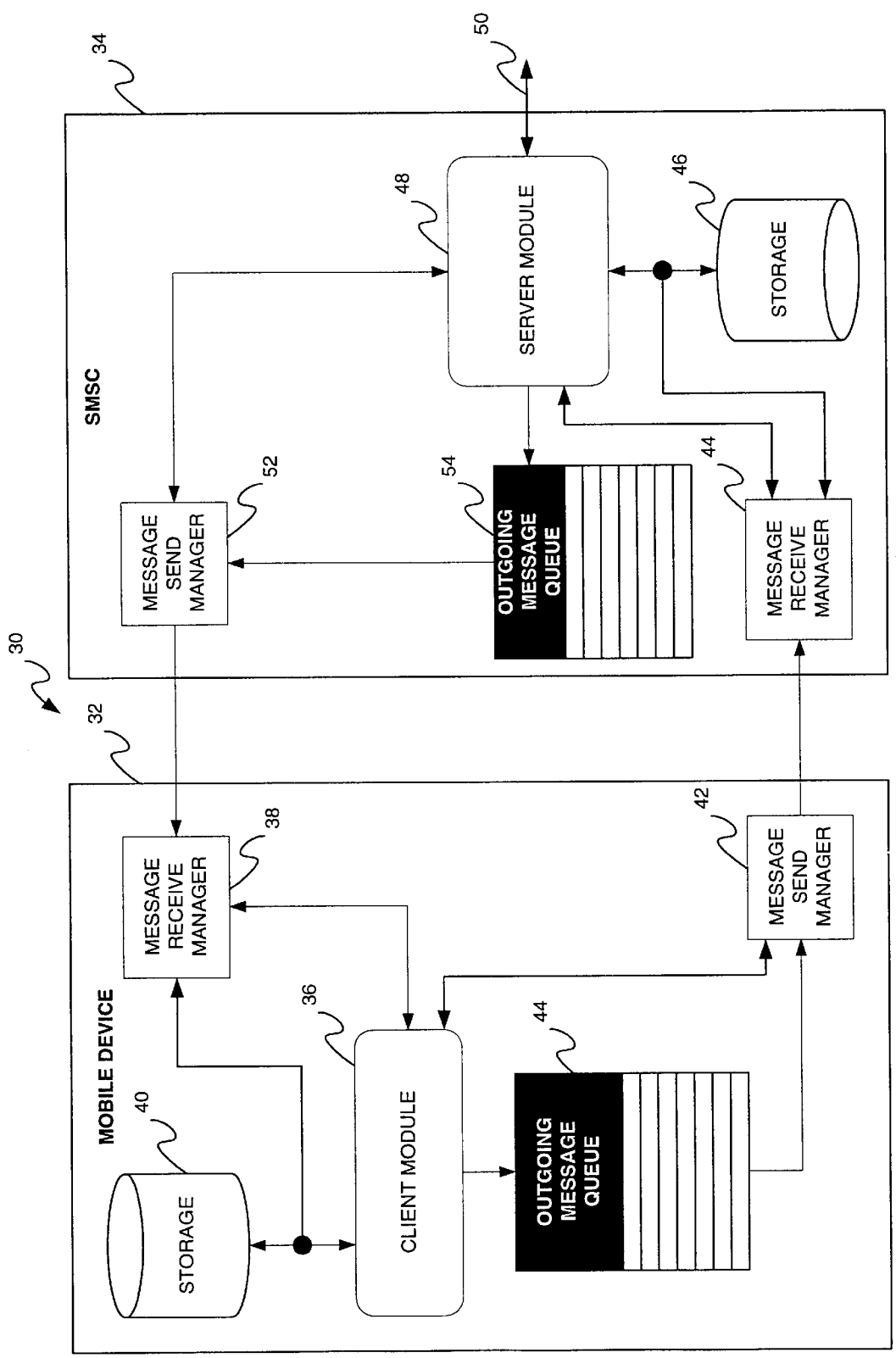
FIG. 1B is a block diagram of a communication system according to one embodiment of the invention.

FIG. 1B is a block diagram of a communication system 30 according to one embodiment of the invention. In this embodiment, communication system 30 utilizes a SMSC (or SMC server) between a mobile device and a remote device. Typically, the remote device is coupled to the SMSC through a network gateway (e.g., proxy server) such as shown in FIG. 1A. Although the network gateway is advantageous for management and protocol conversion operations, a communication system according to the invention could also operate without a network gateway. The SMSC can also couple directly to a wired network (e.g., the wired network) and/or the remote device.

Communication system 30 illustrated in FIG. 1B includes a mobile device 32 and a SMSC 34. The communication between mobile device 32 and SMSC 34 is through a wireless communication channel of a wireless network. Typically, the wireless communication channel is a narrowband channel. As an example, the wireless communication channel can be a SMS channel. Among other things, mobile device 32 includes a client module 36 (e.g., a network browser), a message receive manager 38, a storage area 40, a message send manager 42, and an outgoing queue 44.

Mobile device 32 communicates with SMSC 34 to obtain resources from a remote server. The remote device contains information or resources that mobile device 32 may desire. Initially, the client module 36 (e.g., network browser) requests a resource that originates on the remote device. However, the information or resource often need not be immediately provided and thus can be performed in a non-time critical manner. The client module 36 making a request does not wait to receive the resource; instead, the resource is to be acquired independent of further operation of the client module 36. As an example, such asynchronous requests are particularly useful in certain situations such as where a remote server needs to eventually be updated with some event or action that has occurred on mobile device 32, but mobile device 32 does not need to wait until the remote server is updated before it continues.

Thus, where the request is non-time critical, the client module 36 will forward a request message to the outgoing message queue 44. From the perspective of the client module 36, once the request message has been successfully queued, processing by the client module 36 continues. Then, the message send manager 42 will manage the retrieval of messages (e.g., request messages) from the outgoing message queue 44 and their delivery to the SMSC 34 over the wireless communication channel. The message send manager 42 can also receive time critical requests (or high priority request messages) directly from the client module 36.

At SMSC 34 the incoming messages are received by a message receive manager 44 and temporarily stored in a storage area 46. A server module 48 at the SMSC 34 operates to service the incoming messages. The server module 48 forwards the incoming messages (e.g., request messages) from the storage area 46 to the appropriate remote devices over a network link 50. Messages (whether reply messages or request messages) from the remote device are directed through the server module 48 to a message send manager 52 or to an outgoing message queue 54. Typically, those messages being sent to the outgoing message queue 54 are non-time critical messages. The message send manager 52 manages the sending of the messages received from the server module 48 or from the outgoing message queue 54 over the wireless communication channel to the mobile device 32.

Normally, whenever a message is received, it is acknowledged. When message send manager 52 is preparing to send an acknowledgement message over the wireless communication channel to a particular mobile device as is typically done to acknowledge receipt of a message, message send manager 52 examines outgoing message queue 54 to determine if any messages therein are also destined for the particular mobile device. When there is a message in the outgoing message queue 54 for the particular mobile device, then the message (or a portion thereof) is inserted into the acknowledgement message and thus sent with the acknowledgement. Periodically, the message send manager 52 can review the contents of the outgoing message queue 54 to insure no messages are delayed too long before being sent.

When the wireless communication channel through the wireless network is available, message send manager 52 operates to send messages to the message receive manager 38 of mobile device 32 via he wireless communication channel. Message receive manager 38 hen supplies the incoming messages to storage area 40. Message receive manager 38 can also notify client module 36 that the requested resource has been received. When the incoming message is an acknowledgement message, message receive manager 38 is able to parse the acknowledgement to separate the additionally inserted message (or portion thereof from the acknowledgement message.

The information can be exchanged in either or both directions. More particularly, the use of acknowledgement messages also works in the reverse direction—for acknowledgement messages sent from mobile device 32 or to SMSC 34. These acknowledgement messages can carry information or resources from mobile device 32 to SMSC 34 or some remote device. SMSC 34 typically couples to a network gateway which in turn couples to a remote server. Upon receiving the acknowledgement message, server module 48 forwards the acknowledgement message to the initial sender. Typically, the initial sender of the message being acknowledged is a remote device coupled to the SMSC 34 via a network gateway. As needed, the acknowledgement message can be modified to produce a status message for transport to the initial sender. The status message is also considered an acknowledgement message even though possibly modified for other network characteristics (e.g., protocols).

Further, any device receiving messages is able to process an acknowledgement message to include additional information as discussed above. Although FIG. 1B indicates that the mobile device 32 and the SMSC 34 can operate to provide the more efficient use of acknowledgement messages. Additionally, either or both the network gateway and the remote device can also implement the more efficient use of acknowledgement messages.

In general, the destination (recipient) device for the initial message needs to be able to process an acknowledgement message to include other information destined for the sender device (i.e., same destination address). The destination device (mobile, SMSC, network gateway or remote device) for the modified acknowledgement message needs to understand how to parse the modified acknowledgement message. A message typically includes a source address, a destination address, and data. The data can take a variety of forms and have a variety of effects. The data can, for example, request information from a destination device, supply information to a destination device, cause some action at a destination device.

Figure 1C:
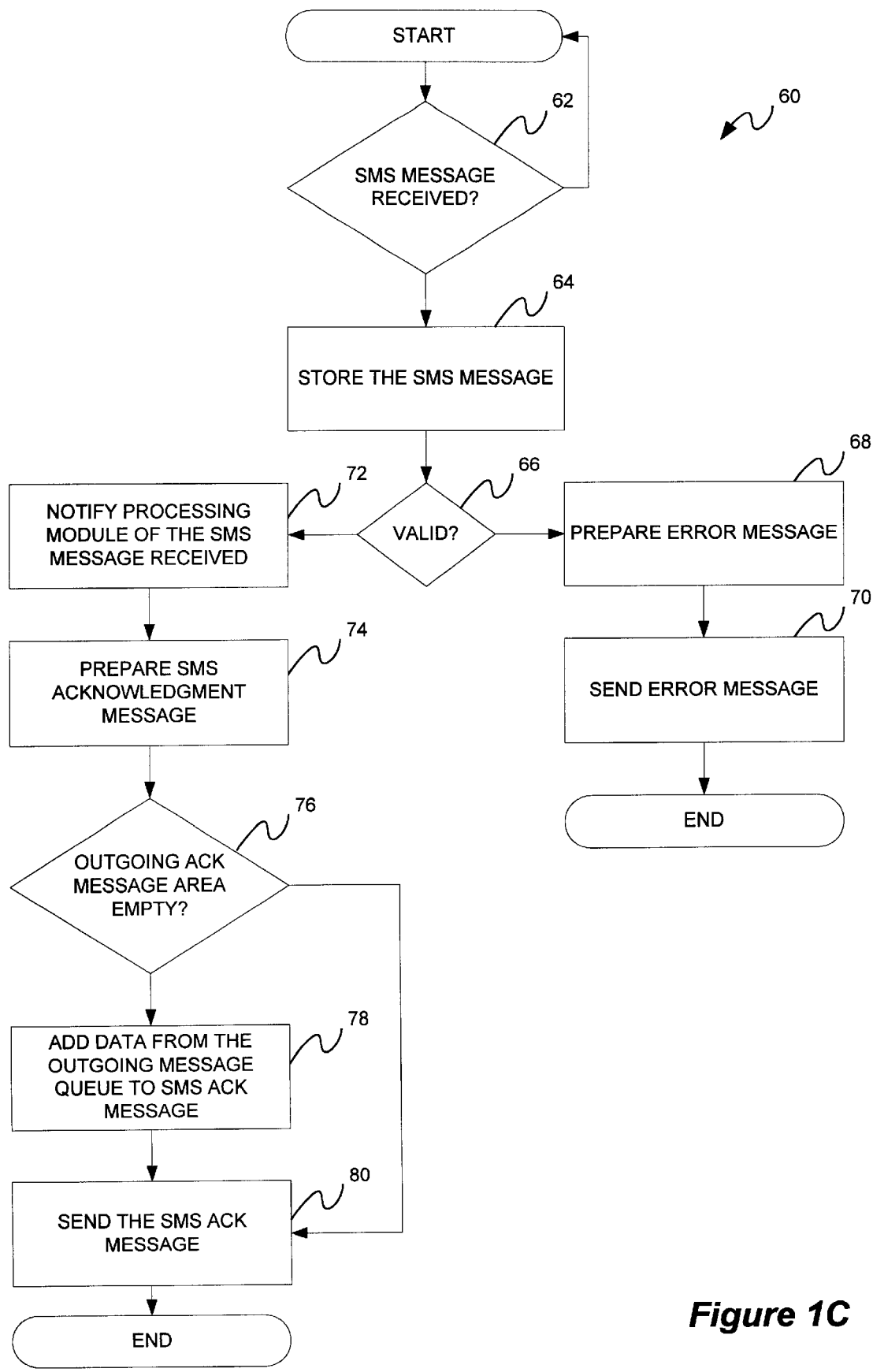
FIG. 1C is a flow diagram of a message acknowledgement processing according to an embodiment of the invention.

FIG. 1C is a flow diagram of a message acknowledgement processing procedure 60 according to an embodiment of the invention. Message acknowledgement processing procedure 60 is performed by any device or server that operates to acknowledge receipt of messages. For example, message acknowledgement processing procedure 60 can be performed by mobile device 32 or SMSC 34 illustrated in FIG. 1B or network gateway 14, SMSC 18 or remote device 22 illustrated in FIG. 1C. In this embodiment, the messages are considered to be SMS messages, which are messages of a limited size. However, other types of messages besides SMS messages can also be used.

Message acknowledgment processing procedure 60 begins with a decision block 62 that determines whether a SMS message has been received. When decision block 62 determines that a SMS message has not yet been received, message acknowledgment processing procedure 60 awaits the reception of such a message. Once a SMS message has been received, message acknowledgment processing 60 is effectively invoked.

After message acknowledgement processing procedure 60 is invoked, the SMS message is stored at block 64. Here, the SMS message is stored, for example, in an incoming message queue. Then, a decision block 66 determines whether the SMS message is valid. If the decision block 66 determines that the SMS message is not valid, then an error message is prepared at block 68. Then, the error message is sent at block 70. The error message is sent to the sender of the SMS message that was received at block 62. Representative error messages for SMS are described below with reference to FIGS. 6B and 7B. Following block 70, the message acknowledgment processing 60 is complete and ends when the received SMS message was not valid.

On the other hand, when decision block 66 determines that the SMS message is valid, then the processing module is notified of the SMS message received at block 72. As an example, the processing module can be the client module 36 of the mobile device 32, the server module 48 of the SMSC 34, or some other processing module of another device (e.g., proxy server or remote server). Then, an SMS acknowledgment message is prepared at block 74. At this point, the SMS acknowledgment message resembles a conventional acknowledgment message typically automatically produced by the server that has received the SMS message. Representative acknowledgement messages for SMS are described below with reference to FIGS. 6A and 7A.

Next, a decision block 76 determines whether an outgoing message queue is empty. When decision block 76 determines that the outgoing message queue is not empty, then data obtained from the outgoing message queue is added to the SMS acknowledgment message at block 78. The data from the outgoing message queue that is added to the SMS acknowledgment message is data that is destined for the original sender of the received SMS message.

On the other hand, when decision block 76 determines that the outgoing message queue is empty, block 78 is bypassed. Following block 78, as well as following the decision block 76 when the outgoing message queue is empty, the SMS acknowledgment message is then sent at block 80. The SMS acknowledgment message is sent to the original sender of the SMS message that was received. Following block 80, message acknowledgment processing procedure 60 is complete and ends.

Here, it should be noted that the SMS acknowledgement message is automatically directed back to the sender of the received SMS message being acknowledged. In some embodiments, the SMS acknowledgement message is directed back to an intermediate server and then directed back again to the initial sender of the message. For example, where a message originated by an initiating machine and send to a SMSC which in turn sends a SMS message to the receiving machine, the SMS acknowledgement is first send to the SMSC and then the SMSC can send an acknowledgement to the initiating machine. Hence, the acknowledgement message is able to carry the additional data back to the initiating machine.

In one implementation, the SMS acknowledgment message has a user data field. The data from the outgoing message queue is added to the user data field while updating another field known as the user data field length. Typically, the user data field is limited in size so typically only a limited amount of data from the outgoing message queue would be added to the SMS acknowledgment message. In one example, the user data field can carry all the data for a particular message stored in the outgoing message queue. However, in more sophisticated designs, it is possible that multiple relatively short messages from the outgoing message queue could be provided in the user data field such that it carries a plurality of messages. Still further, the messages from the outgoing message queue could be fragmented before being added into the user data field to allow for greater length messages to be sent in this manner over multiple acknowledgement messages.

Also, it should be noted that the data added to the acknowledgement messages need not be traditional text messages but could be any type of data that might be exchanged between sending and receiving devices. For example, the data could be a text message, an indicator for a voice mail message, electronic mail, a page, a resource (previously requested or being pushed to the recipient), an alert, a configuration file, a script, or an executable.

Figure 2A:
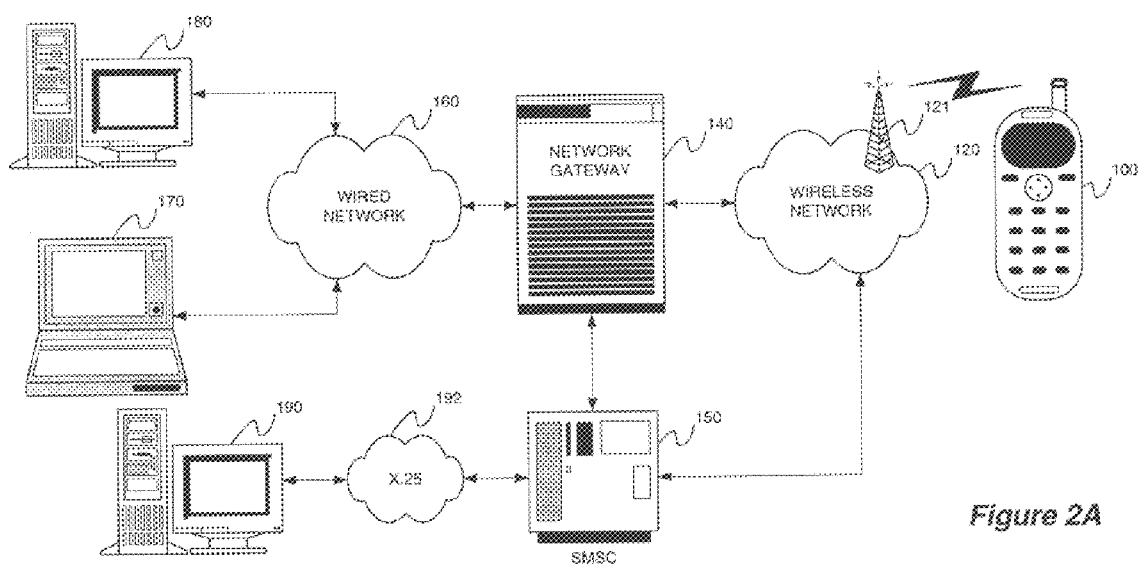
FIG. 2A is a block diagram of a wireless data communication system according to another embodiment of the invention.

FIG. 2A is a block diagram of a wireless data communication system according to another embodiment of the invention. The wireless data communication enables wireless client devices, including a representative wireless client device 100, to communicate with information servers over one or more networks. As examples, wireless client device 100 can be a mobile phone, a cellular phone, a palm sized computing device or a personal digital assistant.

Wireless client device 100 is coupled to a proxy server device 140 and a short message service (SMS) server 150 through an airnet (e.g., a wireless network) 120. Airnet 120 can, for example, be a GSM network. Proxy server device 140 is also known as a gateway server, a link server, or a network gateway. Proxy server device 140 acts as a bridge between landnet 160 and airnet 120 with respect to messages requiring larger bandwidths. Short message service (SMS) server 150 also acts as a bridge between the proxy server device 140 and the wireless client device 100 for messages requiring smaller bandwidths (i.e., short messages).

Proxy server device 140 is further coupled to a landnet 160 to which a personal computer 170 and an information server 180 are coupled. The landnet 160 is a land-based, wired network that may include the Internet, an Intranet, or some other wired data network. Information service server 180 is representative of one or more network servers coupled to landnet 160 and providing hypermedia information including mobile data information for wireless client device 100. The personal computer 170 represents one or more standard computers (desktops or laptops) that can be used to send messages to wireless client device 100.

In addition, information service server 190 is representative of one or more network servers that can couple directly to SMS server 150 via a direct interface 192 (e.g., X.25) or a private network. The information service server 190 is representative of one or more network servers coupled directly to short message service (SMS) server 150 via the direct interface (e.g., X.25) 192. Both the information servers 180 and 190 can be used to provide hypermedia information for the wireless client device 100. The proxy server device 140, the short message service (SMS) server 150, and information service servers 180 and 190 are typically operated on workstation computers utilizing an operating system suitable for networked environments such as Microsoft Windows NT or Unix.

Airnet 120 is a wireless network and an antenna 121 represents a wireless carrier infrastructure for airnet 120. The wireless carrier infrastructure generally includes a Base Station Subsystem (BSS), a Network Subsystem (NSS) and an operations and maintenance center. The base station controls radio or telecommunication links with wireless client device 100. The operations and maintenance center can include a mobile switching center performing the switching of calls between the mobile devices and other fixed or mobile network users. Further, the operations and maintenance center manages mobile account services, such as authentication, and oversees the proper operation and setup of the wireless network. Each of the components and processes of the wireless carrier infrastructure are known to those skilled in the art and are not described herein to avoid unnecessarily obscuring the aspects of the invention.

According to one embodiment, the communication protocol in the landnet 160 is HyperText Transfer Protocol (HTTP) (or HTTPS a secure version of HTTP) and runs on Transmission Control Protocol (TCP). According to one embodiment, the upper level communication protocol in airnet 120 is Wireless Access Protocol (WAP) or Handheld Device Transport Protocol (HDTP) (formerly known as Secure Uplink Gateway Protocol (SUGP)), which preferably run on Wireless Datagram Protocol (WDP) or User Datagram Protocol (UDP). The above-described protocols have been provided for purposes of illustration and not restriction. One of ordinary skill in the art will appreciate that the present invention can be practiced using other land based and wireless protocols.

Figure 2B:
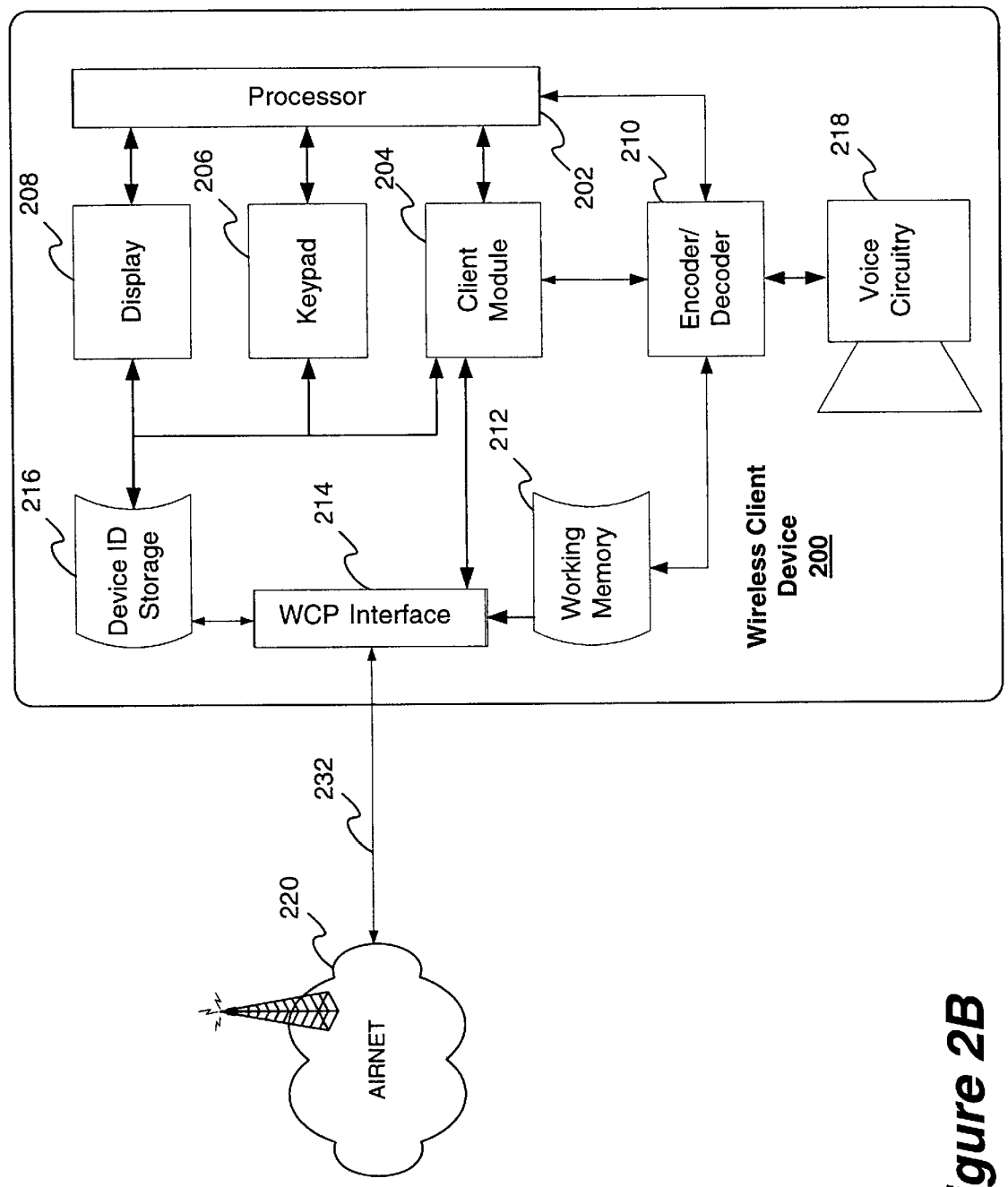
FIG. 2B is a block diagram of a wireless client device according to one embodiment of the invention.

FIG. 2B is a block diagram of a wireless client device 200 according to one embodiment of the invention. Wireless client device 200 can, for example, represent wireless client device 100 of FIG. 2A.

Wireless client device 200 includes a processor 202 and a client module 204. Client module 204 includes processes that are performed by processor 202 to operate wireless client device 200.

Client module 204 works in conjunction with processor 202 and a working memory 212 to perform the processing tasks performed by wireless client device 200 including establishing a communication session with proxy server device 140 via airnet 220, requesting and receiving data via airnet 220, displaying information on the display 208, and receiving user (subscriber) input from a user via the keypad 206. Client module 204 can also operate, among other things, implement a browser, commonly referred to as micro-browser, which requires much less computing power and memory than well-known HTML browsers do. The micro-browser is, preferably, a HDML micro-browser. One such micro-browser is, for example, available from Unwired Planet, Inc. located at 800 Chesapeake Drive, Redwood City, Calif. 94063. Additional details on accessing a server device from a mobile device using a micro-browser are described in U.S. Pat. No. 5,809,415, which is hereby incorporated by reference.

Wireless client device 200 includes a WCP interface 214 that couples to airnet (wireless network) 220 via a radio-frequency (RF) transceiver (not shown) to receive incoming and outgoing signals over a wireless channel 232. A device identifier (ID) storage 216 supplies a device ID to WCP interface 214. The device ID identifies a specific code that is associated with wireless client device 200. The device ID is used by proxy server device 140 to associate wireless client device 200 with a user account provided in proxy server device 140. The device ID can be a phone number of the device or a combination of an IP address and a port number. An example of a combination of an IP address and a port number is 204.163.165.132:01905 where 204.163.165.132 is the IP address and 01905 is the port number. The device ID is further associated with a subscriber ID authorized by a wireless network carrier (and stored in proxy server device 140) as part of the procedures to activate a subscriber account for wireless client device 200. The subscriber ID is a unique identification to a subscriber of wireless client device 200. In other words, each of the wireless client devices serviced by proxy server device 140 has a unique device ID that corresponds to a respective user account in proxy server device 140.

Wireless client device 200 also includes voice circuitry 218 (e.g., a speaker and a microphone) and the associated hardware (e.g., an encoder/decoder 210, processor 202 and the keypad circuitry 206) which provide a telephone mode of operation which is separate and distinct from a data mode of operation used when interfacing with proxy server device 140. In the telephone mode of operation, a subscriber can cause wireless client device 200 to place a phone call to another party having a phone, either wireless or land-based.

A message queue (e.g., outgoing message queue) can be maintained in the working memory 212 and managed by the client module 204. The client module 204 and the processor 202 also implement a message manager (i.e., message receive manager 38 and message send manager 42).

Figure 3:
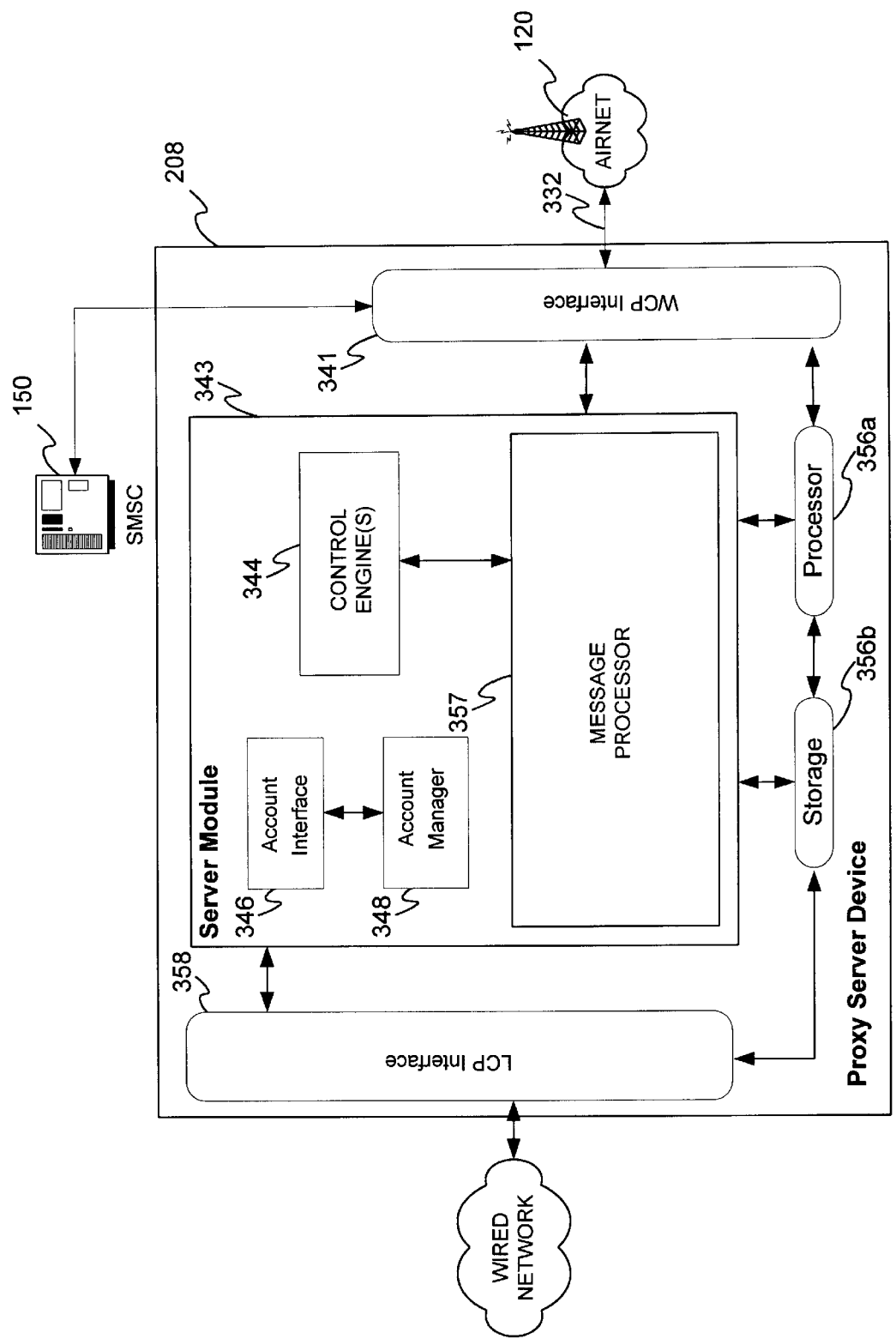
FIG. 3 is a block diagram of proxy server device according to one embodiment of the invention.

FIG. 3 is a block diagram of proxy server device 340 according to one embodiment of the invention. Proxy server device 340 can, for example, be the proxy server device 140 of FIG. 2A. Proxy server device 340 serves as a gateway between the airnet 120 and landnet 160.

Proxy server device 340 includes a Land Control Protocol (LCP) interface 358 that couples to landnet 160, and a Wireless Control Protocol (WCP) interface 341 that couples to airnet 120. A server module 343 is coupled between the LCP interface 358 and the WCP interface 341. Further, it will be appreciated that the principles of the invention can be used with a wide variety of wireless networks, including such wireless networks as CDPD, GSM, CDMA and TDMA, to name a few.

Server module 343 performs traditional server processing as well as protocol conversion processing from one communication protocol to another communication protocol. According to one embodiment, the protocol conversion processing can be implemented as a separate module referred to as a mapper. In the case of protocol conversion between HDTP (or WSP) and HTTP, the conversion is a straight data mapping relationship. It is understood to those skilled in the art that WCP interface 341 can be readily replaced by other interface module when airnet 120 uses other communication protocol, the same is true to LCP interface 358 when landnet 160 uses a different communication protocol.

Server module 343 includes a control engine 344 and a message processor 357. Control engine 344 interacts with SMS server 150 via WCP interface 341 to coordinate the reception or delivery of messages (including notifications and requests). The message processor 357 receives messages from landnet 160 via LCP interface 358 and performs a series of processing and management activities.

Server module 343 also includes an account manager 348 and an account interface 346. Account manager 348 manages a plurality of user accounts for all the mobile devices serviced by proxy server device 340. Each of the wireless client devices 100 serviced by proxy server device 340 may be assigned a device identification (ID). Account manager 348 is responsible for creating a user account for each of the wireless client devices that communicate with proxy server device 340. Account manager 348 control access of wireless client devices to services provided by the proxy server device 340 and the SMS server 150.

It is understood that the user accounts may be stored in another network server coupled proxy server device 340. In other words, the user accounts can be kept in a database that is physically placed in any computing device coupled to landnet 160.

Proxy server device 340 also includes a processor 356a and storage 356b as the primary hardware components. Processor 356a performs operations in accordance with the server module 343. It should be understood to those skilled in the art that the proxy server device 340 is a piece of hardware equipment that includes one or more processors (e.g., processor 356a), working memory (e.g., storage 356b), buses, interfaces and other components. On the other hand, the server module 210 represents a software module, which contains processes (e.g., compiled and linked processes) loaded into the working memory to perform designated functions by proxy server device 340. The same distinction is equally applied to client modules within the wireless client devices.

Figure 4:
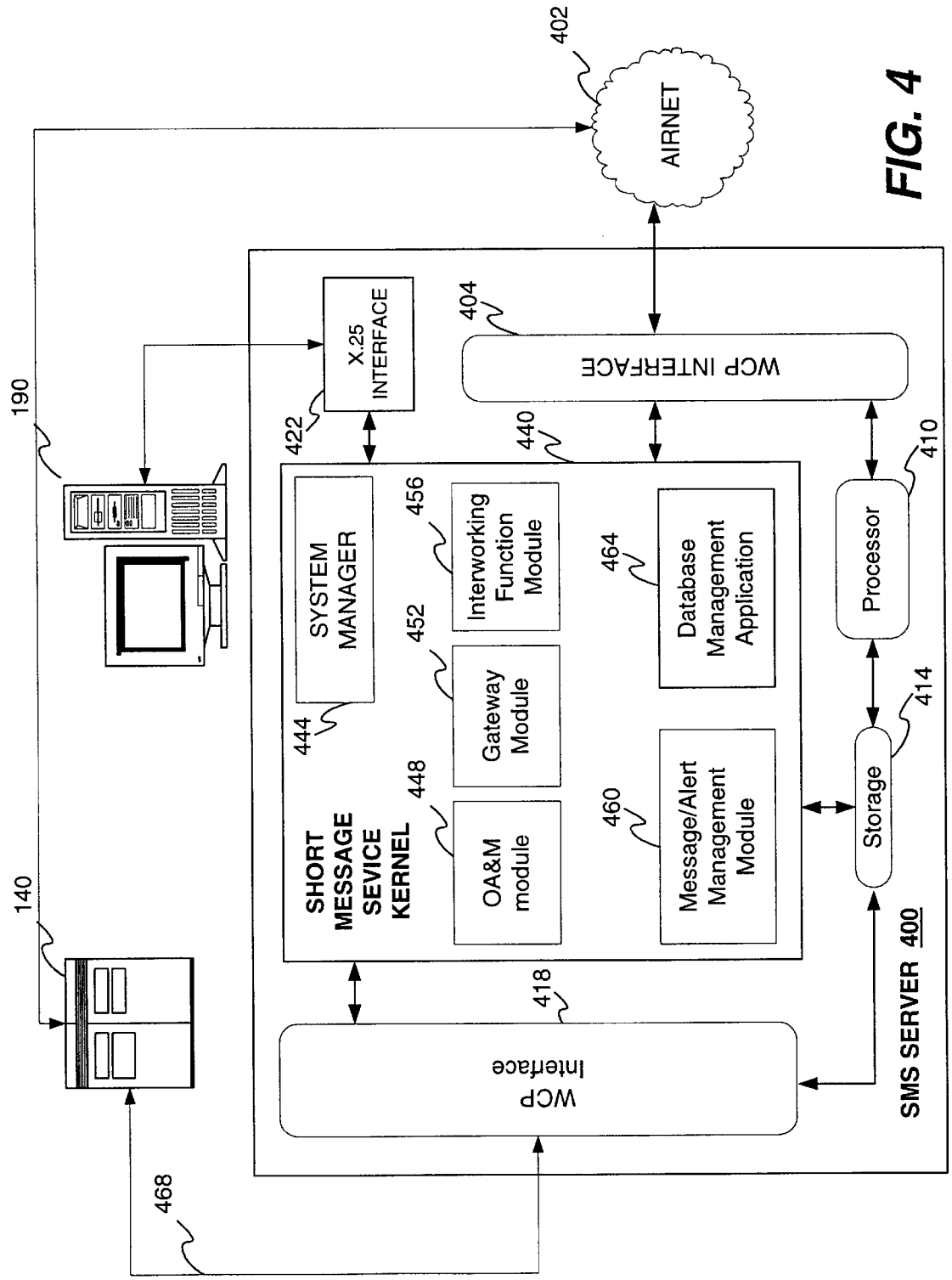
FIG. 4 illustrates a functional block diagram of Short Message Service (SMS) server according to one embodiment of the invention.

FIG. 4 illustrates a functional block diagram of Short Message Service (SMS) server 400 according to one embodiment of the invention. SMS server 400 can, for example, be SMS server 150 of FIG. 2A.

SMS server 400 includes a Short Message Service (SMS) kernel 440 coupled between two Wireless Control Protocol (WCP) interfaces 404 and 418, a processor 410, a storage device 414, and an X.25 interface 422. Storage device 414 can store databases and messages for the serviced wireless client devices. For example, SMS server 400 can utilize storage device 414 to store an outgoing queue of data (messages) awaiting delivery for each of the wireless client devices being supported by SMS server 400.

SMS kernel 440 is typically loaded in memory and executed by processor 410 to perform traditional server processing. SMS kernel 440 can also perform protocol conversion from one communication protocol to another communication protocol (i.e., for the X.25 interface). The X.25 interface is an often used with public data communications networks. X.25 interface 422 provides a connection with information server 190 without having to go through proxy server device 140.

SMS kernel 440 includes a system manager 444, an overall administration and maintenance (OA&M) module 448, a gateway module 452, an inter-working function module 456, a message/alert management module 460, and a database management application 464. System manager 444 manages overall system operation. OA&M module 448 provides services for billing, administration and network management. Gateway module 452 coordinates activity between proxy server device 140 and SMS server 400. Inter-working function module coordinates activity between SMS server 400 and information server 190, such as through X.25 interface 422. Message/alert management module 460 provides management for transmission and reception of messages and providing of alerts. The database management application 464 manages a database of user account information.

SMS server 400 is coupled to proxy server device 140 through a land-based channel 468. SMS server 400 is coupled to the wireless client devices it services through airnet 120. In this embodiment, the communication protocol used in airnet 120 and over land-based channel 468 is WAP or HDTP, which preferably runs on UDP or WDP. SMS server 400 is also coupled to the information server 190 through the X.25 interface 422. The protocol for the X.25 interface 422 can be any protocol supported by the X.25 standard.

Figure 5:
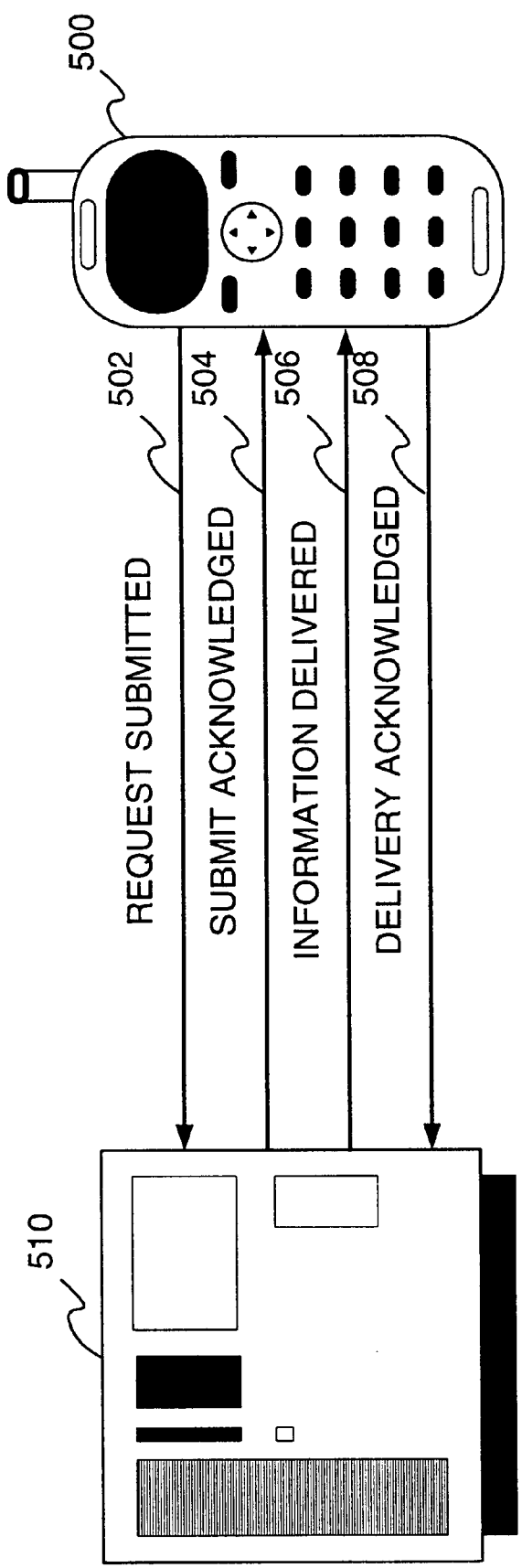
FIG. 5 illustrates a functional block diagram of the client-server relationship between a wireless client device and a Short Message Service (SMS) server.

FIG. 5 illustrates a functional block diagram of the client-server relationship between a wireless client device 500 and a Short Message Service (SMS) server 510. As an example, wireless client device 500 and SMS server 510 may represent wireless client device 100 and SMS server 150 of FIG. 2A, respectively. According to one scenario, during its operation, wireless client device 500 will submit a request 502 to SMS server 510. Typically, in the case of SMS, the request is a short message that is to be directed to an addressee. SMS server 510 receives the request from wireless client device 500 and determines whether the request is valid. For example, a request can be deemed valid when it does not have errors, has not expired, and the message has not been received before. When the request is determined to be valid, an acknowledgement 504 is sent from SMS server 510 to wireless client device 500. Acknowledgement 504 is typically done with an acknowledgement (ACK) message such as a Submit Success Report (SSR). On the other hand, when the request is determined not to be valid, then an error notification is sent from SMS server 510 to wireless client device 500. As an example, the error notification is an error message such as a Submit Error Report.

In a similar fashion, according to another scenario, when SMS server 510 has information to be delivered to wireless client device 500, the information is transmitted 506 to wireless client device 500. Typically, the information is contained in a short message to be delivered to wireless client device 500. Upon receiving the information, wireless client device 500 determines if the received information is valid. For example, a request can be deemed valid when it does not have errors, has not expired, and the message has not been received before. When the information is determined to be valid, a delivery acknowledgement 508 is sent from the wireless client device 500 to the SMS server 510. Delivery acknowledgement 508 is typically done with an acknowledgement (ACK) message such as a Delivery Success Report (SSR). On the other hand, when the information is determined not to be valid, then an error notification is sent from wireless client device 500 to SMS server 510. As an example, the error notification is an error message such as a Delivery Submit Error Report (DER).

In the case of SMS, the Submit Success Report (SSR), Submit Error Report (SER), the Delivery Success Report (DSR), and Delivery Error Report (DER) have well-defined structures as described with reference to FIGS. 6A, 6B, 7A and 7B. Additional details pertaining to these structures are provided in Global System for Mobile Communications (GSM) 03.40, versions 5.6.1, European Telecommunications Standards Institute (ETS) (ETS 300 901), January 1998, which has been previously incorporated by reference.

Figure 6A:
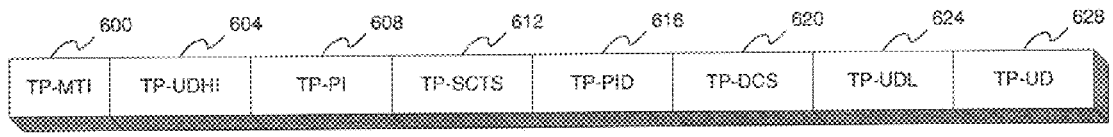
FIG. 6A illustrates a format for a Submit Success Report (SSR)

FIG. 6A illustrates a format for a Submit Success Report (SSR). The Submit Success Report (SSR) includes a message type indicator (TP-MTI) 600, a User-Data-Header Indication (TP-UDHI) 604, an Optional Parameter Indicator (TP-PI) 608, a SMS server time stamp (TP-SCTS) 612, a Protocol Identifier (TP-PID) 616, a Data Coding Scheme (TP-DCS) 620, a User Data Length indicator (TP-UDL) 624, and User Data (TP-UD) 628. User Data (TP-UD) 628 may include a User Data Header (UDH) comprised of reference number, an index indicating the total number of chunks of user data, and a chunk index. User Data (TP-UD) 628 is ordinarily unused in the SSR acknowledgements.

Figure 6B:
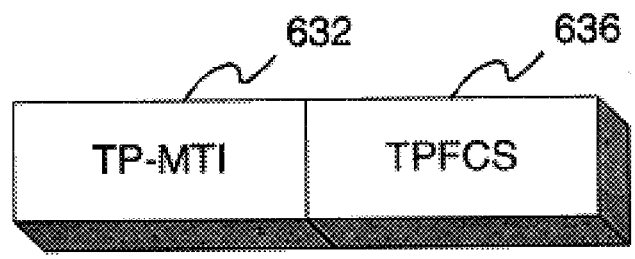
FIG. 6B illustrates a format for a Submit Error Report (SER)

FIG. 6B illustrates a format for a Submit Error Report (SER). The Submit Error Report (SER) includes a message type indicator (TP-MTI) 632 and a Failure Cause (TPFCS) 636.

Figure 7A:
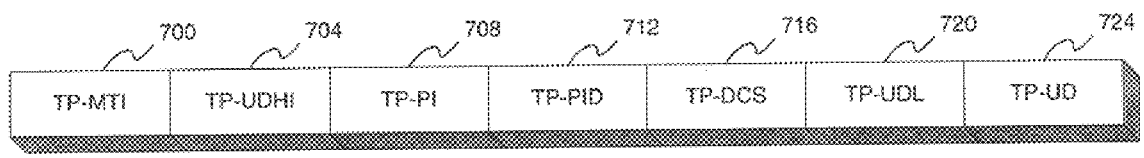
FIG. 7A illustrates a format for a Delivery Success Report (DSR)

FIG. 7A illustrates a format for a Delivery Success Report (DSR). The Delivery Success Report (DSR) includes a message type indicator (TP-MTI) 700, a User-Data-Header Indication (TP-UDHI) 704, an Optional Parameter Indicator (TP-PI) 708, a Protocol Identifier (TP-PID) 712, a Data Coding Scheme (TP-DCS) 716, a User Data Length Indicator (TP-UDL) 720, and User Data (TP-UD) 724. The User Data 724 may include a User Data Header (UDH) comprised of a reference number, an index indicating the total number of chunks of user data, and a chunk index. User Data (TP-UD) 724 is ordinarily unused in the DSR acknowledgements.

Figure 7B:
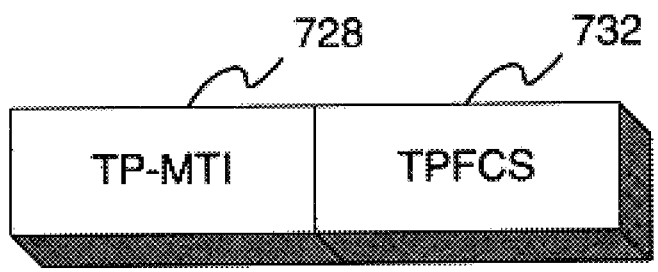
FIG. 7B illustrates a Delivery Error Report (DER)

FIG. 7B illustrates a Delivery Error Report (DER). The Delivery Error Report (DER) includes a Message Type Indicator (TP-MTI) 728 and a Failure Cause (TPFCS) 732.

Figure 8A:
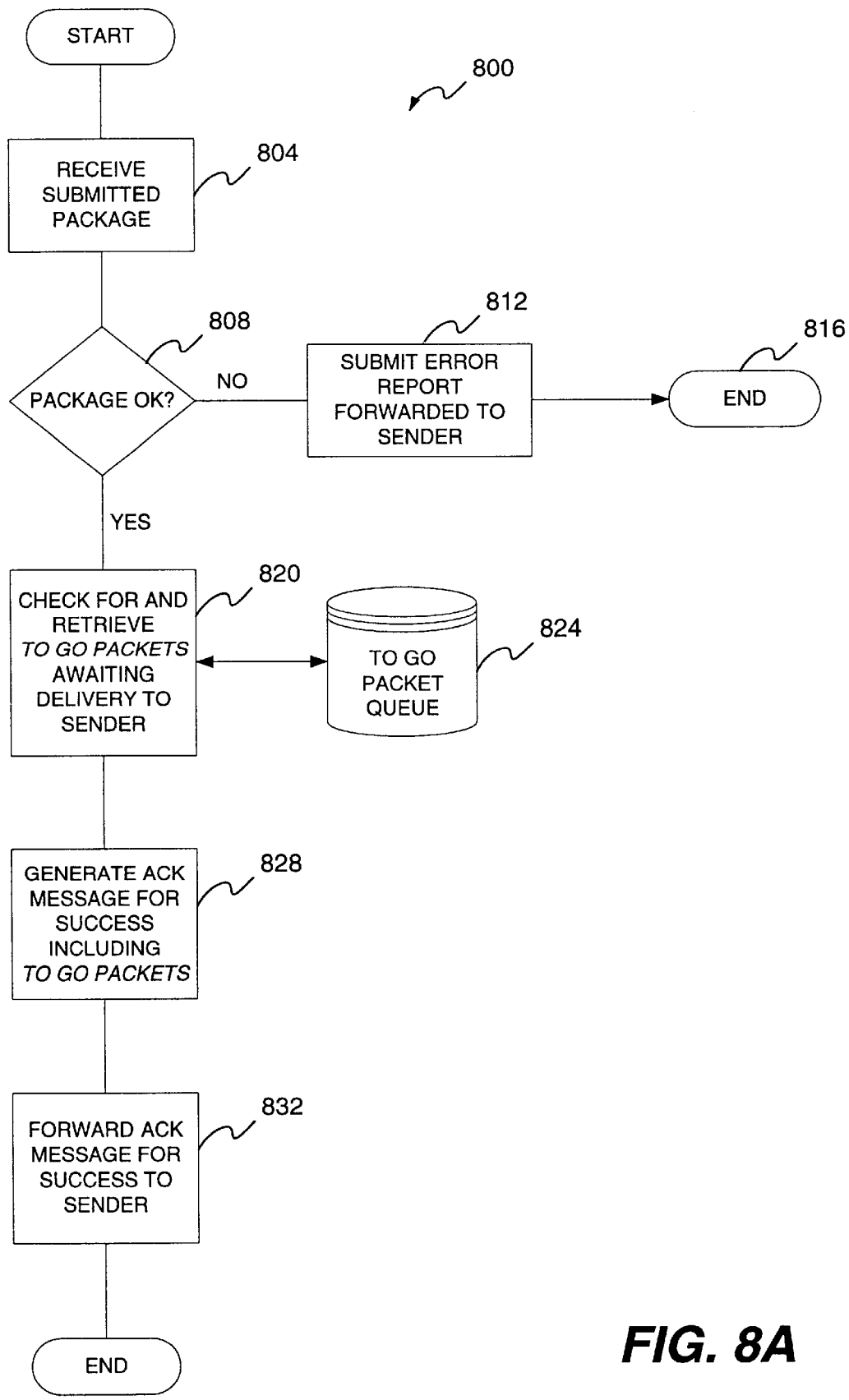
FIG. 8A is a flow diagram of Submit Success Report (SSR) processing according to an embodiment of the invention.

FIG. 8A is a flow diagram of Submit Success Report (SSR) processing 800 according to an embodiment of the invention. A Short Message Service (SMS) server (e.g. 510 of FIG. 5) receives 804 a submitted request packet from a wireless client device (e.g. 500 of FIG. 5). The SMS server makes a determination 808 regarding the validity of the received packet. If the received packet is determined to be invalid a Submit Error Report (SER) (FIG. 6B) is generated and forwarded 812 to the originating wireless client device 816. If the received packet is determined to be valid, a check is made for packets awaiting delivery to the sender (TO GO PACKETS). These packets are stored in the TO GO PACKET storage queue 824. This process may take place in the SMS server or in any server with a connection to the SMS server. The TO GO PACKETS awaiting delivery to the sender are retrieved 820. When the Submit Success Report (SSR) is generated 828, the TO GO PACKETS are inserted as user data (TP-UD) and the User Data Length Indicator (TP-UDL) is updated to reflect the insertion. Finally, the Submit Success Report (SSR) including the TO GO PACKETS are forwarded 832 to the originating wireless client device. Following the forwarding 832, SSR processing 800 is complete and ends.

Figure 8B:
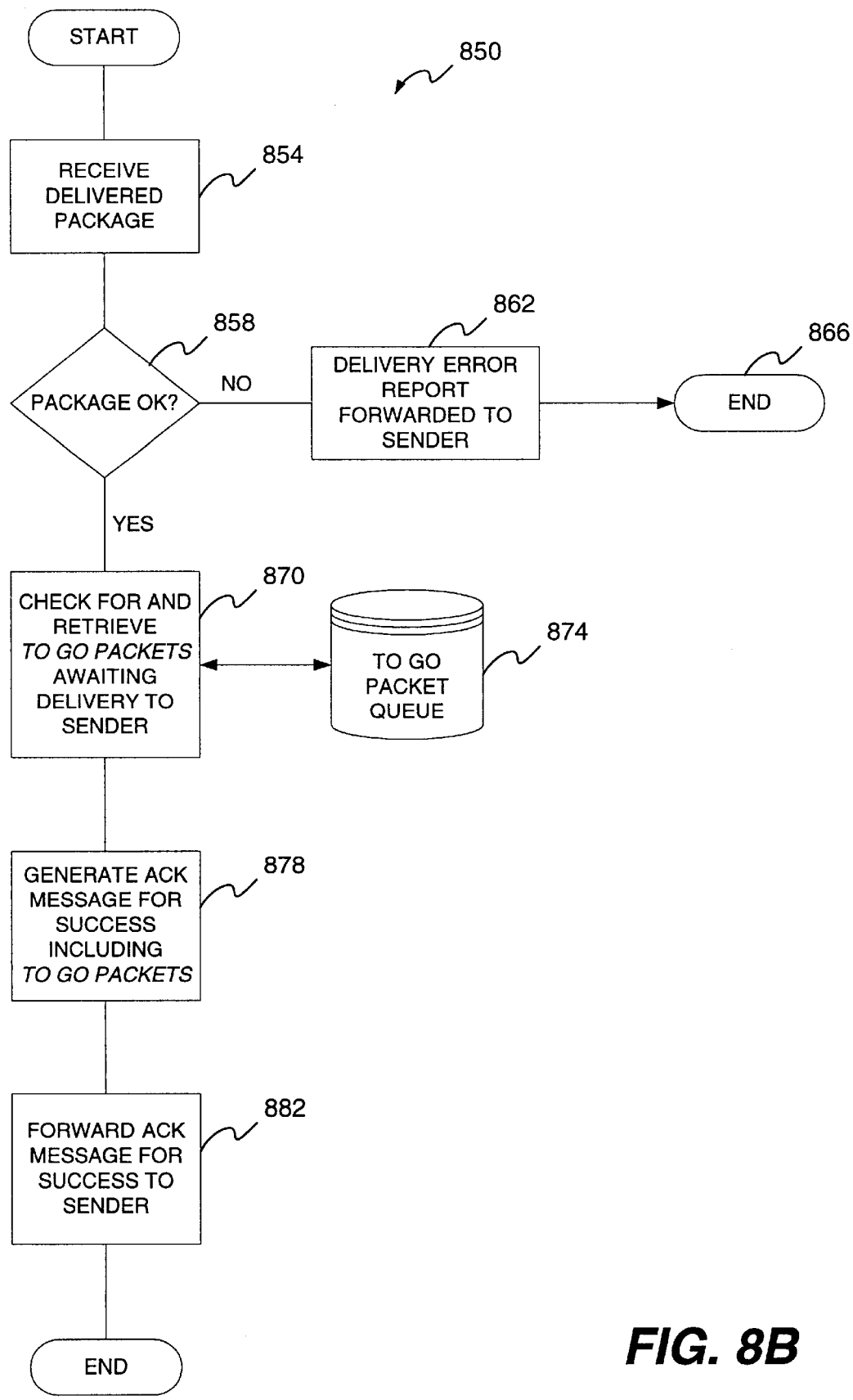
FIG. 8B is a flow diagram of Delivery Success Report (DSR) processing according to an embodiment of the invention.

FIG. 8B is a flow diagram of Delivery Success Report (DSR) processing 850 according to an embodiment of the invention. A wireless client device (e.g. 500 of FIG. 5) receives 854 an information packet from an originating server, which may be the SMS server or any server connected to the SMS server. The wireless client device makes a determination 858 regarding the validity of the received information packet. If the received information packet is determined to be invalid, a Delivery Error Report (DER) (FIG. 7B) is generated and forwarded 862 to the originating server. The originating server can be the SMS server or any server connected to the SMS Server. If the received packet is determined to be valid, a check is made for packets awaiting delivery to the sender (TO GO PACKETS). These packets are stored in the TO GO PACKET storage queue 874 resident on the wireless client device. The TO GO PACKETS awaiting delivery to the sender are retrieved 870. When the Delivery Success Report (DSR) is generated 878, the TO GO PACKETS are inserted as user data field (TP-UD) and the User Data Length Indicator (TP-UDL) is updated to reflect the insertion. Finally, a Delivery Success Report (DSR) including the TO GO PACKETS are forwarded 882 to the originating server. Following the forwarding 882, the DSR processing 850 is complete and ends.

In the case of both the Submit Success Report (SSR) and the Delivery Success Report (DSR) the User Data Field (TP-UD) has an associated User Data Length Indicator (TP-UDL). As previously stated, the User Data (TP-UD) may contain a UDH comprised of a reference number, an index indicating the total number of chunks of user data, and a chunk index. This structure provides a mechanism to parse (or fragment) large messages (larger than the space provided in TP-UD) and send them as smaller chunks of information (chunk encoding).

The advantages of the invention are numerous. Different embodiments or implementations may yield one or more of the following advantages. One advantage of the invention is that wireless devices to more efficiently utilize the available transmission bandwidth of a narrowband channel (e.g., SMS channel) in a wireless network. Another advantage of the invention is that it facilitates cost-effective use of a narrowband channel (e.g., SMS channel) in a wireless network. Still another advantage of the invention is that non-time critical messages can be sent over a wireless network in efficient, cost-effective way.

While only certain embodiments of the invention have been illustrated and described herein, many modifications, substitutions, changes, and equivalents will now occur to those skilled in the art. It is therefore to be understood that the appended claims are intended to cover all such modifications and changes as fall within the true spirit of the invention.

What is claimed is:

1. A method for sending messages between a client device and a server device through a narrowband channel of a wireless data network, said method comprising:

(a) receiving a message at the client device, the message being sent from the server device to the client device through the narrowband channel of the wireless data network;

(b) preparing an acknowledgement message to be returned to the server device, the acknowledgement message including at least a portion of another message destined for the server device, said preparing (b) includes at least the operations of:

(b1) preparing a standard acknowledgement message indicating that the message has been successfully received by the client device;

(b2) determining whether there are additional messages waiting to be sent to the server device; and (b3) modifying the standard acknowledgement message to include at least a portion of one of the additional messages, thereby producing the acknowledgement message to be returned to the server device; and (c) sending the acknowledgement message to the server device, wherein the standard acknowledgement message includes a user data field, and wherein said modifying (b3) operates to include at least a portion of one of the additional messages in the user data field.

2. A method as recited in claim 1, wherein the server device is an information server.

3. A method as recited in claim 1, wherein the client device is selected from the group consisting of: personal digital assistant, a mobile telephone device, or a pager, each of which has limited computing resources and a small display screen.

4. A method as recited in claim 1, wherein the message is a SMS message, and wherein the acknowledgement message is one of a Submit Success Report and a Delivery Success Report.

5. A method as recited in claim 1, wherein the narrowband channel is a SMS channel, and the message is an SMS message.

6. A method as recited in claim 1, wherein the additional message is a response to the message.

7. A method as recited in claim 1, wherein the additional message is unrelated to the message.

8. A method as recited in claim 1, wherein said method further comprises:

sending the message from the server device to the client device through the narrowband channel of the wireless data network.

9. A method of transmitting message packets from an initiating unit to a receiving unit over a wireless data network using a Short Message Service Center, said method comprising:

maintaining, at the receiving unit, a message queue of messages awaiting delivery;

receiving, at the receiving unit, a message from the initiating unit over the wireless communications using the Short Message Service Center;

determining whether the received message is valid;

determining whether the message queue contains a deferred message awaiting delivery to the initiating unit;

generating an acknowledgement message that incorporates within a user data field thereof at least a portion of the deferred message awaiting delivery to the initiating unit; and forwarding the acknowledgement message to the initiating unit over the wireless communications using the Short Message Service Center.

10. A method as recited in claim 9, wherein the receiving unit is a server device and the initiating unit is a wireless client device.

11. A method as recited in claim 9, wherein the initiating unit is a server device and the receiving unit is a wireless client device.

12. A method as recited in claim 9, wherein the message is a SMS message, and wherein the acknowledgement message is one of a Submit Success Report and a Delivery Success Report.

13. A method as recited in claim 9, wherein the wireless data network uses a wireless communications protocol.

14. A method as recited in claim 13, wherein the wireless communications protocol is selected from a group consisting of Wireless Access Protocol (WAP) and Handheld Device Transport Protocol (HDTP).

15. A method as recited in claim 9, wherein the acknowledgement message can incorporate up to a predetermined amount of data, and wherein when the deferred message has a size greater than the predetermined amount, the deferred message can be divided into a plurality of components each having a size not greater than the predetermined amount.

16. A method as recited in claim 9, wherein the deferred messages in the message queue are assigned priorities, and wherein said determining of whether the message queue contains a deferred message awaiting delivery to the initiating unit operates to select the one of the deferred messages in the message queue awaiting delivery to the initiating unit based on the assigned priorities.

17. A method as recited in claim 9, wherein said wireless client device is selected from a group consisting of: personal digital assistant, a mobile telephone device, or a pager.

18. A computer readable medium including computer program code for sending messages between a client device and a server device through a channel of a wireless data network, said computer readable medium comprising:

computer program code for receiving a message at the client device, the message being sent from the server device to the client device through the channel of the wireless data network;

computer program code for preparing an acknowledgement message to be returned to the server device, the acknowledgement message including data destined for the server device, said computer program code for preparing includes at least computer program code for preparing a standard acknowledgement message indicating that the message has been successfully received by the client device;

computer program code for determining whether there are additional messages waiting to be sent to the server device; and computer program code for modifying the standard acknowledgement message to include at least a portion of one of the additional messages, thereby producing the acknowledgement message to be returned to the server device; and computer program code for sending the acknowledgement message to the server device, wherein the standard acknowledgement message includes a user data field, and wherein said computer program code for modifying operates to include at least a portion of one of the additional messages in the user data field.

19. A computer readable medium as recited in claim 18, wherein the data is a resource.

20. A computer readable medium as recited in claim 18, wherein the data is unrelated to the message being acknowledged by the acknowledgement message.

21. A computer readable medium as recited in claim 18, wherein the data is a reply to the message being acknowledged by the acknowledgement message.

22. A computer readable medium as recited in claim 18, wherein the client device is selected from the group consisting of: personal digital assistant, a mobile telephone device, or a pager, each of which has limited computing resources and a small display screen.

23. A computer readable medium as recited in claim 18, wherein the message is a SMS message, and wherein the acknowledgement message is one of a Submit Success Report and a Delivery Success Report.

24. A computer readable medium as recited in claim 18, wherein the additional message is a response to the message.

25. A computer readable medium as recited in claim 18, wherein the additional message is unrelated to the message.

26. A computer readable medium as recited in claim 18, wherein the channel is a narrowband channel.

27. A computer readable medium including computer program code for transmitting message packets from an initiating unit to a receiving unit over a wireless data network using a Short Message Service Center, said method comprising:

computer program code for maintaining, at the receiving unit, a message queue of messages awaiting delivery;

computer program code for receiving, at the receiving unit, a message from the initiating unit over the wireless communications using the Short Message Service Center;

computer program code for determining whether the received message is valid;

computer program code for determining whether the message queue contains a deferred message awaiting delivery to the initiating unit;

computer program code for generating an acknowledgement message that incorporates within a user data field thereof at least a portion of the deferred message awaiting delivery to the initiating unit; and computer program code for forwarding the acknowledgement message to the initiating unit over the wireless communications using the Short Message Service Center.

28. An apparatus for sending and receiving messages over a wireless data network, said apparatus comprising:

an outgoing data queue that stores data to be sent over the wireless data network;

a message manager, the message manager manages (i) the reception of incoming messages from senders over the wireless data network and (ii) the generation of outgoing messages to be sent over the wireless data network;

a storage medium that store s the incoming messages; and a processing module operatively connected to said message manager and said storage medium, said processing module interacts with said storage medium and said message manager to request, send and receive data over the wireless data network, wherein the outgoing messages generated by said message manager include acknowledgement messages that acknowledge the receipt of at least some of the incoming messages, and depending on availability of data in said outgoing data queue, the acknowledgement messages generated by said message manager include, within user data fields of the acknowledgement messages, data from said outgoing data queue destined for the respective senders of the incoming messages being acknowledged.

* * * * *